(12) United States Patent
Turnbull et al.

(10) Patent No.: US 6,195,792 B1
(45) Date of Patent: Feb. 27, 2001

(54) SOFTWARE UPGRADES BY CONVERSION AUTOMATION

(75) Inventors: Mark Andrew Turnbull; Harold Joseph Johnson, both of Nepean (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/026,173

(22) Filed: Feb. 19, 1998

(51) Int. Cl.$^7$ ............................................. G06F 9/45
(52) U.S. Cl. ............................. 717/5; 717/8; 717/1
(58) Field of Search .................... 395/705, 706, 395/704, 708; 717/5, 6, 4, 8, 1

(56) References Cited

U.S. PATENT DOCUMENTS 5,581,696 * 12/1996 Kolawa et al. ..................... 714/38

OTHER PUBLICATIONS

Farnum, Pattern–based Tree Attribution, ACM 089791–453–8/92/0001/0211, Aug. 1992.*
Aho–Sethi–Ullman, Compiler: Principles, Techniques, and Tools, Chapter 6, Addison–Wesley Publishing Company, Sep. 1985.*
Consel–Danvy, Static and Dynamic Semantics Processing, ACM 089791–419–8/90/0012/0014, Aug. 1990.*
Petterson–Fritzson, DML–A meta–language and System for the Generation of Practical and Efficient Compilers from Denotational Specifications, IEEE 0–8186–2585–Jun. 1992.*
Maranget, Compiling Lazy Pattern Matching, ACM 0–89791–483–X/92/0006/0021, Oct. 1992.*
Lai et al., Architecture Development Environment, IEEETENCON'93, Nov. 1993.*

* cited by examiner

*Primary Examiner*—Kakali Chaki
*Assistant Examiner*—Hoang-Vu Antony Nguyen-Ba

(57) ABSTRACT

A semantic-based system is provided to upgrade software written in a high level language of the kind having a type system and being statically compiled in compilers which check types and usages at compile time. The system employs conversion declarations which are inserted into the source code of the software and executed by the compiler. These declarations comprise a list of substitutable parts, with each substitutable part having a list of properties, a set of semantic patterns to be matched using the substitutable parts, and a result pattern showing what will be substituted for each matching portion of source code.

16 Claims, 3 Drawing Sheets

NORMAL OPERATION

| SIZE | OPERATION | ... 1st OPERAND REP... | ... 2nd OPERAND REP... | ... |
|------|-----------|------------------------|------------------------|-----|

VARIADIC OPERATION

| SIZE | OPERATION | COUNT | ... 1st OPERAND REP... | ... 2nd OPERAND REP... | ... |
|------|-----------|-------|------------------------|------------------------|-----|

FIG. 3

| SIZE | FOR | ... INIT-EXP REP... | ... TEST-EXP REP... | ... STEP-EXP REP... | ... BODY-STMT REP... |
|------|-----|---------------------|---------------------|---------------------|----------------------|

FIG. 4A

| SIZE | BLOCK | 23 | ... 1st STMT REP... | ... 2nd STMT REP... | ... 3rd STMT REP... | ... |
|------|-------|-----|---------------------|---------------------|---------------------|-----|

FIG. 4B

SOFTWARE UPGRADES BY CONVERSION AUTOMATION

BACKGROUND OF THE INVENTION

This invention relates to a conversion declaration for use in upgrading source code of a program and to a programming compiler for implementing conversion declarations.

Most high level programming languages used in writing large software programs (e.g., JAVA, C, C++, COBOL, FORTRAN-IV, FORTRAN-90, ADA, PL/1, MODULA-2, MODULA-3, EIFFEL, ML, HASKELL, SATHER) have a type system and are statically compiled in compilers which check types and usages (i.e. semantic usages) at compile time. A "type system" means that each variable in the program has a type associated with it. Example types are integers, floating point numbers, and characters. It is often necessary to upgrade such a software program. To facilitate this process, text-based pattern matching and substitution systems are known. However, such systems have a number of drawbacks which may be highlighted by considering the following C code fragment:

```
01   { int my_var = 7;
02
03   struct MS {
04        float my_var;
05        char code;
06   } my_struct;
07
08   my_struct.
09        my_var = 12.0 + my_struct.my_var;
10
11   {    char my_var = 'M';
12        char other_var = my_var + trunc(my_struct.my_var);
13        struct MS *my_var_ptr = &my_struct;
14        if    (my_var_ptr->my_var) printf(stdout,  "non-
              zero ");
```

A text-based pattern matching and substitution system cannot distinguish among the three different variables named my_var, declared on lines 01, 04, and 11, without heroic efforts. That is because the semantics of an identifier can be highly diverse within a single program in almost any high-level programming language.

A text-based system also has considerable difficulty distinguishing between the two different kinds of accesses to my_struct.my_var on line 09: the first occurrence is a write access, and the second is a read access.

A text-based system cannot tell that the expressions my_struct.my_var on line 09 and my_var_ptr->my_var on line 14 are denotationally identical (except possibly for the structure instance affected), because they do not 'look' alike.

Similarly, a text-based system cannot easily distinguish among expressions by type: for example, it cannot readily recognize that on line 12, my_var is a char-valued expression (that is, it is a character type expression), whereas trunc (my_struct.my_var) is an int-valued expression (that is, it is an integer valued expression).

Another problem area for text-based pattern matching and substitution is that, due to the lack of type- and usage-checking associated with text-based substitutions, the changes made in the program text must be checked by responsible, expert programmers. This creates two difficulties:

1. Checking is significant work for the responsible expert programmers, especially where the program is large and the changes are not isolated to a small portion of the program.

2. The text delta (list of changes in the program text) may be very large, even where (semantically speaking) what is happening is simply a specific change which could be stated, in English, in a sentence or two. (For example: "Change all read references to data_base_index to current_env.data_base_index. Change all write references to data_base_index from data_base_index=Newvalue to log_update (data_base_index,NewValue.")

This makes tracking the system changes a huge job: it hides individually significant changes by burying them in masses of stereotyped changes.

A final problem area for text-based pattern-matching and substitution systems is that they are not scoped in the same way as normal program entities. Consider, for example, the following C code fragment:

```
01       extern int K;
02       #define incr(X)   (X += K)
         . . .
03       void next_step (double J,K) {
04       {
05            int count = current_count;
06            incr(count);
```

(The " . . . " represents omitted material.)

If a programmer wrote code along the above lines, then the effect of the call to the incr macro on line 06 would almost certainly not be what the programmer intended. Its effect, as written, would be to increase the value of the local count variable by the value of the double parameter, K. However, from the declaration context on lines 01–02, it appears that the intent would be that count should be incremented by the value of the extern int K.

The problem is that the scope of macros is entirely different from that of ordinary declared program entities (variables, constants, routines, types, etc.). Here, the handling of incr is done by the C pre-processor (cpp) which uses a completely different processing strategy from the C compiler proper, and takes no cognizance of C scoping rules.

This invention seeks to overcome drawbacks of prior software upgrading systems.

SUMMARY OF INVENTION

According to the present invention, there is provided a conversion declaration for use in upgrading source code of a program which has a type system and is statically compiled in a compiler which checks types and usages at compile time, comprising: a list of substitutable parts, with each substitutable part having a list of properties; a set of one or more semantic patterns to be matched using said substitutable parts; and a result pattern showing what will be substituted for each matching portion of said source code.

A compiler utilizing such a conversion declaration is also provided.

According to another aspect of the present invention, there is provided a method for upgrading a source code of a program of a type which has a type system and is statically compiled in a compiler which checks types and usages at compile time, comprising the steps of: comparing portions of said source code with semantic patterns in a set of one or more semantic patterns and a list of substitutable parts, with each substitutable part having a list of properties; on finding a matching source code portion, determining whether said matching source code portion comprises a pre-selected type, procedure or module and, if so, converting said matching source code portion to a result pattern.

BRIEF DESCRIPTION OF THE DRAWINGS

In the figures which illustrate preferred embodiments of the invention,

FIG. 3 is a Polish form representation of a source code fragment,

FIGS. 4a and 4b are Polish form representations of source code fragments, and

DETAILED DESCRIPTION OF THE PREFERRED EMBODIMENTS

The subject invention employs a semantic-based conversion of a software program in order to effect a modification to the program. This conversion is accomplished by the use of conversion declarations (together with any necessary declarations which define variables used in the conversion declarations) which are inserted at appropriate places into the source code and by appropriate modification to the compiler in order that it may handle the conversion declarations. At compile time, these conversion declarations are executed, as many times as necessary, to implement the desired modifications throughout the program.

To facilitate understanding of conversion declarations, two known semantic devices are first explained: semantic trees and semantic patterns.

Semantic Trees

Consider the C expression:

$$x[i]=x[i-1]*(g-1)*f(y)$$

where the "=", following C rules, denotes assignment of its right operand to its left operand (and not comparison or equality).

Figure 1:
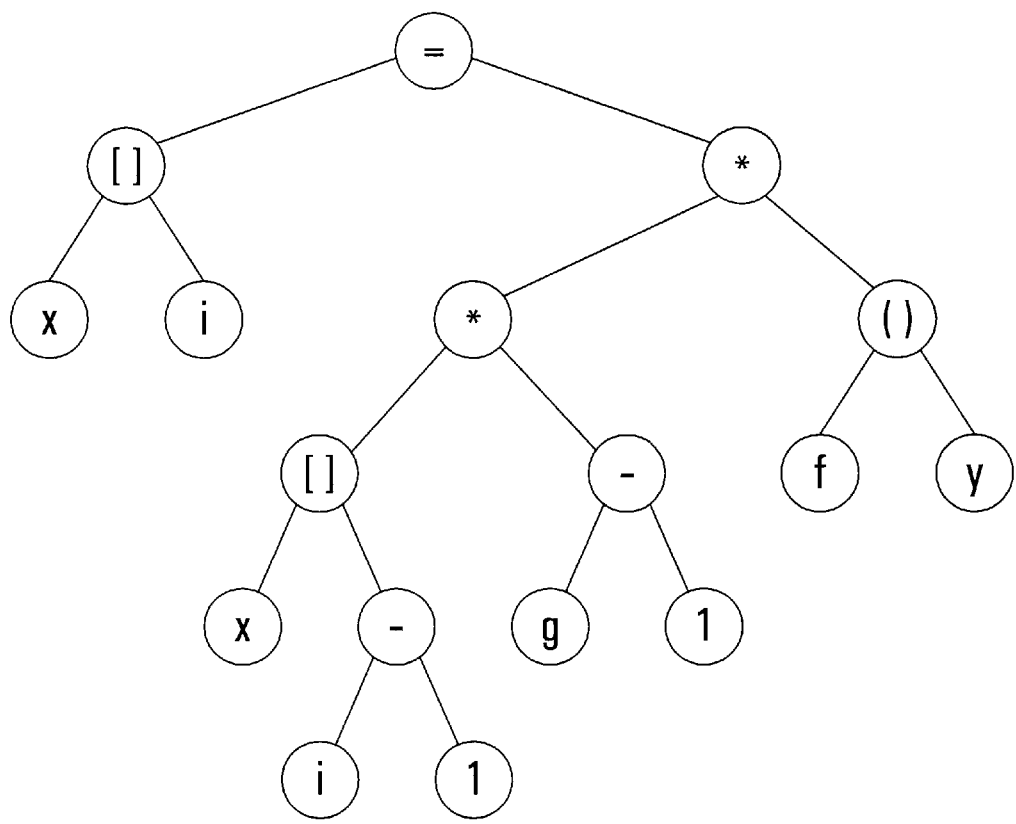
FIG. 1 is a representation of a semantic tree.

This expression is represented as the semantic tree of FIG. 1. It will be noted that the form of the tree follows from the precedence and associativity of the operators and the parenthesizing of the operands.

The leaf nodes (x, i, x, i, 1, g, 1, f, y) represent operands. The internal nodes represent language-defined operations which, in this case are "=" meaning "assign"; "[]" meaning "index"; "*" meaning "multiply"; "−" meaning "subtract; and "()" meaning "function call".

Note that textual details such as parentheses (where they do not denote the function call operation) are omitted. Grouping of operands is implied by the semantic tree with no need to include the parentheses as one might for a text-oriented parse tree. Ordering of the operand edges in the tree from left to right is significant, because x-y and y-x are quite different semantically. Even sub-trees composed entirely of mathematically associative and commutative operations, such as addition, cannot actually be restructured without a change of semantics when hardware floating point operations are used for implementation. Properties, such as loss of significance, can depend greatly on expression tree structure, so what the programmer coded should be what happens.

FIG. 1 illustrates all but one essential property of a semantic tree: All mode identifications denoting specific entities or operations must be exact. For example, the type of the operands is relevant to the operation performed for all interior nodes, and the exact denotation of variables and functions also. Thus, the node identification for a node labelled "u" would distinguish the type of u and distinguish that particular u from any other distinctly declared u in the program.

For example, if u were a long int (i.e., a long integer) declared in the second block nested within the third block nested within function h, then the identification for a node labelled u might actually be something like:

| ( name: | u |
|---|---|
| type: | long int |
| scope: | local |
| function: | h |
| block_loc: | (3,2) |
| ) | | whereas if u were a float (i.e., a floating point number) declared to be global in scope as an extern, then its identification might actually be something like:

| ( name: | u |
|---|---|
| type: | float |
| scope: | extern |
| function: | ~ |
| block_loc: | ~ |
| ) | |

The use of "~" does not mean "unspecified". It means "absent" or "not applicable here". That is, use of "~" is precise. It indicates something which is definitely not present or applicable.

Type information for such specifications must be complete. For example, a bit-field three bits wide might have a type specified by type: unsigned int :3 and an array parameter in a function might have a type specified by type: float [50] []

That is, bit-field width and known array dimension(s) is relevant "type" information.

Individual occurrences of an identified identity such as the two different kinds of u above also need access mode information. Which access modes exist will depend on the programming language. For example, a variable in C can be accessed in the following ways:

1. Variable address (var_addr): An example is the C expression, &x which takes the address of an addressable variable x. This includes the case of a structure or union where a member is addressed.

2. Constant address (const_addr): Same as 1., except that the variable addressed has the const attribute. This includes the case of a constant structure or union where a member is addressed.

3. Assign to addressable variable (var_assign): The mode of an addressable non-const variable which is the left operand of = in an assignment or the initialization of a declaration.

4. Read and assign addressable variable (var_update): The mode of an addressable, non-const variable which is the operand of prefix or suffix ++ or −− or the left operand of +=, −=, *=, /=, %=, &=, =, |=, <<=, or >>=, or the mode of a struct or union variable when one of its members is modified in part, or read and assigned, or simply overwritten. The reason that a union member assignment is not treated as having var_assign access mode is because there may be 'slack bits' not occupied by the assigned member, members of a union need not all have the same size in memory.

5. Initialize addressable constant (const_assign): The access mode of a newly declared non-bit-field const variable which is being initialized by = in a declaration.

6. Read addressable variable (var_read): the access mode of any addressable non-const variable in all contexts except those mentioned in 1., 3., and 4., including the access mode of a structure or union when a member is read-accessed.

7. Read addressable constant (const_read): the access mode of any addressable const variable in all contexts except those mentioned in 2. and 5., including the access mode of a constant structure or union when a member is read-accessed.

8. Assign to bit-field (bit_assign): the access mode of any bit-field variable which is the left operand of = in an assignment.

9. Read and assign bit-field variable (bit_update): The mode of a bit-field variable which is the operand of prefix or suffix ++ or -- or the left operand of one of +=, -=, *=, /=, %=, &=, =, |=, <<=, or >>=.

10. Read bit-field (bit_read): the access mode of any bit-field variable in all contexts except those mentioned in 8. and 9.

11. Pure value (pure_val): the access mode of a pure value; i.e., one not immediately tied to any memory location, such as the value of an expression such as "(x+1)" or the value returned from a function call.

12. Unvalued (no_val): the access mode of a statement, or of an expression preceding a "," operator—whether or not it provides a value, it certainly provides no value which is used.

Note that fine distinctions are made among modes in the C language. The access mode has a profound effect on what semantic substitutions are legitimate (for example, for mode 9., a substitution which used the & (pointer to) operator, which needs an addressable operand, would not be appropriate).

Thus, a full identification of the foregoing node labelled "u" would be as follows:

| ( name: | u |
|---|---|
| type: | float |
| scope: | extern |
| function: | ~ |
| block_loc: | ~ |
| access_mode: | var_read |
| ) | | where the access mode specifies that u is a read-only variable.

Semantic Patterns

A semantic pattern is a semantic tree in which the specification of one or more nodes may have been made less precise in order to allow various semantic trees to match it. In fact, semantic trees comprise that subset of semantic patterns in which all nodes are precisely identified.

Figure 2:
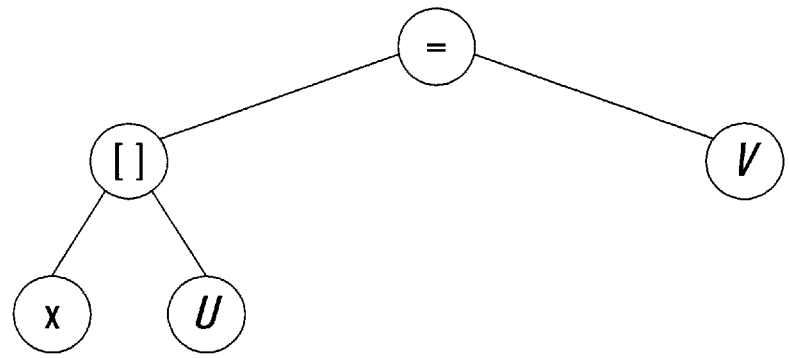
FIG. 2 is a representation of a semantic pattern.

An example semantic pattern is illustrated in FIG. 2. Referencing FIG. 2, capitals are used for the names of pattern wild-cards to distinguish them from ordinary declared variable and constant names.

If, referencing FIG. 2, x is an array of type float and U and V are specified as follows:

| ( name: | U |
|---|---|
| type: | long int |
| scope: | ? |
| function: | ? |
| block_loc: | ? |
| access_mode: | var_read \| var_assign |
| ) | |

(where the "var_read|var_assign" access mode specification indicates that a match is possible for either of var_read or var_assign access mode, and "?" is used to indicate "don't care", i.e., anything matches this part of the pattern element specification)

| ( name: | V |
|---|---|
| type: | float |
| scope: | ? |
| function: | ? |
| block_loc: | ? |
| access_mode: | var_read |
| ) | | then the semantic pattern of FIG. 2 matches the semantic tree of FIG. 1.

Note that a pattern variable differs from an ordinary declared variable or constant in being incompletely specified, either through the use of alternatives (as in "var_read|var_assign" above) or through the use of 'don't cares' specified above by "?".

Conversion Declarations

The essential information which is provided by a conversion declaration is as follows:

1. A list of substitutable parts and their properties (with information on what parts of their descriptions are fixed, which have multiple options, and which are "don't cares" as in the description of U and V above).

2. A set of semantic patterns to be matched using the substitutable parts provided in 1., including precise specifications of the fixed parts of the semantic patterns. In this regard, the context of the conversion declaration can typically be used to set some aspects of the fixed parts of the semantic patterns. For example, where a fixed part is represented by a name, say, "xyz", that name will have all of the properties which are tied to it at the point in the program at which the conversion declaration occurs. By way of explanation, any name has a "scope" in the program, which is the parts of the program in which the name is visible. For example, the name "xyz" could be declared in two blocks, one nested within the other. In each block, the name could have entirely different properties. If a conversion declaration were added to the outer block and used "xyz" as a name representing the source pattern, "xyz" would have the properties assigned to it in the outer block.

3. A result pattern which shows what will be substituted for the matching source program entity. A result pattern may also have fixed parts, if so these follow the same scoping rules as those followed in respect of source patterns.

4. What the conversion is tied to, i.e., the conversion can be tied to a type, a procedure (e.g. sub-routine), or a module. If the conversion is tied to a type, an otherwise matching source fragment will only trigger the conversion if the source fragment type matches the type specified in the conversion declaration. On the other hand, if the conversion is tied to a variable or procedure, then an otherwise matching source fragment will only trigger the conversion if the source fragment matches the variable or procedure specified in the conversion declaration. The conversion may also be tied to some entity other than a type, such as use in a particular module. In the case of C, the issue of modules does not arise. After the C pre-processor, cpp, has been run, the compiler is dealing with just one single source program contained in one text file.

A conversion declaration is scoped in the same fashion as routines and types, with symbols in them fixing their meanings at the point where the declaration occurs. With a conversion declaration, then, the meaning of an expression such as "extern int K" is fixed at its declaration, and any later, more local, definition of K has no effect on the conversion declaration. Thus, conversion declarations are lexically scoped.

This essential information may be specified in a conversion declaration in many different ways. In a preferred form, a conversion declaration has the following syntax: convert entire_mode [self_mode; parm$_1$, parm$_2$, . . . , parm$_m$] source_pattern$_1$; source_pattern$_2$; . . . ; source_pattern$_n$; to result_pattern;
The parts above are to be understood as follows:

parm$_1$, parm$_2$, . . . , parm$_m$

The parameters specify (i.e., list the properties of) the substitutable parts in the semantic patterns generated by the conversion declaration. In some conversion declarations, there will be no parameters.

In the preferred embodiment, the syntax for any one parameter appearing in the parm$_1$, parm$_2$, . . . , parm$_m$ part is:

access_mode_alternatives type name where access_mode_alternatives either have the form of a list of one or more access modes separated by "|":

access_mode$_1$|access_mode$_2$| . . . | access_mode$_k$ or are specified as any_mode (meaning any access mode is an acceptable match, in other words, the access_mode is a "don't care" attribute), and each specifically indicated access_mode is one of:

| | | |
|---|---|---|
| var_read | const_read | bit_read |
| var_assign | const_assign | bit_assign |
| var_update | const_addr | bit_update |
| var_addr | | |
| no_val | | |

The name is the name of the substitutable part.
source_pattern$_1$; source_pattern$_2$; . . . ; source_pattern$_n$;
These are source language fragments, such as expressions or statements, which together with the information provided by the parameters, and the information provided by the properties of names in the context in which the conversion declaration appears, are sufficient to generate the semantic patterns to be matched when the conversion declaration is applied.
result_pattern
The result_pattern determines the result of applying the conversion declaration. Suppose a match occurs between a particular source fragment source_pattern$_i$ (viewed as a semantic tree: the matching semantic tree) and the semantic pattern produced for source_pattern$_i$. Then the result is found by converting the semantic pattern produced by the result_pattern into a semantic tree by substituting for the substitutable parts in the result_pattern those subtrees of the matching semantic tree which match them when source_pattern$_i$ is matched to the matching semantic tree. Since the results are precise, the substitutions turn the result_pattern in to the result semantic tree. The compiler generates code as if the result semantic tree, rather than the matching semantic tree, had been written in the first place.
entire_mode
This specifies the permitted access mode(s) of the entire matching source fragment. A match will not occur unless the matching program entity has one of the specified access modes.
self_mode;
"self" is a reference to the type or class in which the conversion declaration is embedded. "self_mode" is used to restrict what access modes for instances of "self" are considered matches.

The source_pattern$_1$; source_pattern$_2$; . . . ; source_pattern$_n$; portion of the conversion declaration may sometimes use patterns containing multiple statements. To handle such cases in C or C ++, multiple statements may be grouped with "[ . . . ]" brackets within the source_patterns, since "[" can never begin a statement in C or C ++. The same device can be used where such groupings are required in the result_pattern. Other techniques can be used, depending on the programming language.

The preferred syntax for a conversion declaration may be better understood by way of the following examples in the C language.

Consider first a simple example involving a system which handles transactions. To keep track of the number of transactions processed, the system increments a transactions completed count, maintained as a long integer:

++trans_count—or—trans_count++

The system is then modified to process transactions in parallel. The former code for updating trans_count is no longer safe, because the increment is not guaranteed to be atomic. Therefore all such updates need to be replaced with one of the following calls, which call routines implemented to accomplish the equivalent increment actions atomically:
long pre_incr_trans_count () /*if the value is used and was pre-incremented.*/
long post_incr_trans_count () /*if the value is used and was post-incremented.*/
incr_trans_count () /*if the value is not used and was pre-incremented or post-incremented. */

All of this can be accomplished system-wide by the following three conversion declarations (included in an appropriate C header file):

convert pure_val [] ++trans_count; to pre_incr_trans_count();

convert pure_val [] trans_count++; to post_incr_trans_count();

convert no_val [] ++trans_count; trans_count++; to incr_trans_count();

The pure_val and no_val modes above constitute the entire_mode specification, indicating that the expression to be substituted (++trans_count or trans_count++) in its entirety, has the pure_val access mode, since the value of either ++trans_count or trans_count++ is the value of (trans_count+1), which has the pure_val access mode. (The access mode of trans_count itself in the above is, of course, var_update.)

Note that the above conversion declarations would have to be declared where the system-wide trans_count was already defined. The implementation would use the declared meaning of trans_count in its semantic patterns for the above conversion declarations, so that if any programmer declared some other entity named trans_count, whether of the same or a different type, it would not match the semantic patterns based on the above declared meaning of the trans_count name, and would not in any way be affected by the above three conversion declarations.

Now consider a more complicated example involving a (serial) transaction procession system. The bodies of software handling different kinds of transactions are distinct, and are associated with unsigned short identifier values, so that body of software which is handling a transaction can be tracked during execution.

Each transaction is associated with a struct called a trans_context which keeps track of data associated with that transaction. Included in a trans_context is a trans_owner member, which indicates the body of software which originally was selected to handle the transaction and continues to have overall responsibility for handling it. Different trans_contexts can be linked together during execution so that one transaction's handling can be modified depending on the data of other transactions which are in progress.

When one transaction-handling body of software 'visits' a transaction by a link, rather than directly accessing its owned transaction, it records that fact by setting the visited transaction's last_visitor member, so that, if something goes wrong, dependencies on linked transactions can be tracked for debugging purposes.

Suppose a modification to this system is being considered which will convert it from serial to parallel form, where each transaction-handling body of software runs as a sequential process, but the various transaction-handling bodies of software run in parallel with one another. However, before doing so, an estimate is required of the mutual-exclusion overhead which will be incurred by visits to linked transactions. Sometimes a linked transaction will turn out to be simply the current owned transaction, and would therefore incur no added overhead. Therefore, we need to count those visits in which the visited transaction is not the current transaction before any changes are made to make the system parallel.

Suppose x is some trans_context, and we are visiting it by a link (a pointer in some other context's data). We indicate that we are visiting it by executing x.last_visitor=my_id;

where my_id denotes whatever declared or literal constant or variable holds the identifier for the transaction-handling body of software in which this code is executed.

A fragment of the data structures in this system is shown, as it appears after addition of conversion declarations to perform the needed counting of visits to unowned transactions:

```
01    extern unsigned long non_owner_visit_count; /*ADDED*/
02    struct trans_context {
03        unsigned   short        trans_owner;
04        struct     trans_data   *input, *output;
05        unsigned   short        last_visitor;
          ...
06    convert no_val                                /*ADDED*/
07        [ var_update;
08          var_read|const_read|pure_val
09              unsigned short       visitor_act_id  ]
10              self.last_visitor = visitor_act_id;
11        to
12              [ self.last_visitor = visitor_act_id;
13                if (visitor_act_id != self.owner)
14                    ++non_owner_visit_count;
15              ];
16    } /*end struct trans_context*/;
```

What has been added to the original system to perform the counting is shown above as the two declarations marked by the "/*ADDED*/" comments: namely, the declaration of the non_owner_visit_count and the conversion declaration within the trans_context struct's declaration. The only other things left to do to complete the counting job is to add code to place the non_owner_visit_count in global memory with an initial value of zero, and to output the contents of the non_owner_visit_count at an appropriate point, and then run the system. All the rest of the work is done by the two added declarations.

Let's look at the details of what the above conversion declaration actually says. First, the conversion declaration (lines 06–15) is placed within the trans_context struct (lines 02–16). This indicates that the conversion is triggered only in the presence of an instance of the type "struct trans_context" (specifically, in the program context shown, by the appearance of self in the source_pattern on line 10).

no_val (line 06) is an entire_mode which indicates that we are interested only in cases where the entire affected code fragment does not return a value (i.e., appears as a statement). The self_mode, var_update, (line 07) indicates that we are looking for cases where the instance of the type "struct trans_context" is being updated. The next two lines define properties of a substitutable part, visitor_act_id, for the semantic patterns. Specifically, var_read|const_read|pure_val indicate that visitor_act_id may be a readable variable, readable constant, or some other value-oriented expression. unsigned short indicates the visitor_act_id is of type unsigned short.

The source _pattern (line 10) says that we are looking for the occurrence of an assignment in which the last_visitor member of an instance of the type "struct trans_context" is assigned the value of our substitutable part (i.e., last_visitor is assigned an unsigned variable, constant or pure value). The appearance of self represents where in the source pattern our instance of the type "struct trans_context" must appear.

The result_pattern (lines 12–15) says that, when a match occurs on the above criteria, we replace the matched fragment (an assignment statement) by the statements within square brackets, namely the same assignment statement followed by an if-statement which checks to see whether the value of the substitutable element, visitor_act-id, is the same as the owner member in the matching instance of type "struct trans_context", and if not, increments the non_owner_visit_count variable.

For conversion declarations to operate properly in all situations, two additional capabilities are required—avoiding recursion and handling deletions—which are discussed here following.

Literal Source Fragments

Since conversion declarations work by substitution prior to object code generation, rather than by closed linkages, they cannot invoke one another recursively. (To do so would be to incur an infinite expansion.)

However, there are occasions where we want the result_pattern of a conversion to be similar to a source_pattern. To prevent recursion in such cases, we need to provide a literal facility, which indicates that what the programmer wrote is to be taken as written, and not modified by any conversion declaration invocations. The syntax used for expressing this will of course, vary with the programming language in question. For C or C ++, the preferred embodiment is to allow source code forms such as any of:

literal selection_statement
literal iteration_statement
literal compound_statement
literal (expression)
literal [statement_list]

The meaning of a literal code fragment is its 'literal' meaning; i.e., its original meaning unmodified by any conversion declarations. The effect of making it literal is that neither the literal fragment, nor anything within it, can invoke a conversion declaration. In the preferred embodiment, the meaning of the statement, expression, or statement_list modified by literal is the same as it would be without the modifier literal, except for one thing: neither the entire literal-modified entity, nor anything within it, matches any source_pattern within a conversion declaration.

literal cannot be used within a source_pattern of a conversion declaration (source_patterns are implicitly literal to start with). It may, however, be used in a result_pattern, or in ordinary program source text.

As an example to motivate the use of a literal facility, consider the following problem: we want to find out how often entities of type struct data_handle are accessed in the execution of a system. This can be implemented as follows:

```
01 extern unsigned long data_handle_access_count;    /*ADDED*/
02 data_handle *access_data_handle (data_handle *);  /*ADDED*/
   ...
03 struct data_handle {
   ...
04    convert any_mode [any_mode;]                   /*ADDED*/
05        self;
06        to
07        literal(*access_data_handle(&self));
08 };
   ...
09 data_handle *access_data_handle (data_handle *dh) (/*ADDED*/
10     ++data_handle_access_count;
11     return literal(dh);
12 }
```

In our example, the declarations marked "/*ADDED*/" have been added to the original system to support counting the accesses to data_handles during execution. We have added access to a counter in which to keep counts of accesses to data_handles (line 01). We also define a function to do the counting (line 02).

Inside the declaration of the struct data_handle type, we place a conversion declaration (lines 04–07), such that when we express a data_handle, x, in our code, it will be compiled as (*access_data_handle (&x)). Hence every execution of an access in the original program will increment the counter in the corresponding converted program.

Note the use of literal in the above. Without the use of literal, the result_pattern (line 07) would access itself at two points: the entire result_pattern, since it denotes a data_handle, would invoke the self-same conversion declaration, and self, denoting a conversion declaration, would also invoke it.

Absent Entities

Sometimes what is to be accomplished with a conversion declaration involves deleting a named entity (usually, replacing it with another). Yet conversion declarations use semantic patterns, which means that its patterns use names with semantics already attached. The named entity might be a global variable, a member in a structure, a routine, or any kind of entity with a name or type attached.

To support this, absent entities are provided. An absent entity has the same type and properties as its corresponding 'present' entity, except that it does not exist at run-time; i.e., it is a compile-time place-holder for type-checking and other semantic properties. How it is expressed will depend on the programming language in question.

When an entity is absent, then (aside from its declaration), it can only appear in conversion declaration source_patterns. Once all conversion declarations have done their work, all absent entities must have disappeared from the executable code.

In the preferred embodiment in C or C++, absent entities are declared by using the word absent (indicating that entities of this type do not exist at run-time) as a type qualifier (like const, indicating that the entity cannot be modified, inline, indicating that a function is to generate in-line code where possible, or volatile, indicating that the variable may change at any time due to the action of multiple accessing threads of control).

For example, suppose we have a large system in which we have a date structure defined as:

```
struct date {
    unsigned int    dd:5,    /* Day of month */
                    mm:4,    /* Month of year */
                    yy:7;    /* Year minus 1900 */
};
``` where we have, assuming a suitable C implementation, packed the date into 16 bits, at the cost of limiting ourselves to years between 1900 and 2027, inclusive.

Suppose we discover that we must handle a wider range of dates: we now need years before 1900 and after 2027. However, the date structure has been used wholesale throughout our entire system. Conversion declarations together with an absent entity facility can address this problem, as follows.

We redeclare our date structure as follows:

```
01  struct date {
02      unsigned int    dd      : 5,    /* Day of month */
03                      mm      : 4;    /* Month of year */
04      signed int      yyyy    :23;    /* Year */
05      absent
06      unsigned int    yy      : 7;    /* Year - 1900 */
07      convert any_mode [var_update;
08                       var_read|const_read|pure_val int E]
09          self.yy = E;
10          to
11          self.yyyy = E + 1900;
12      convert var_read|const_read [var_read|const_read;]
13          self.yy;
14          to
15          self.yyyy - 1900;
16  };
```

The absent member declared on lines 05–06 takes up no space in a date and does not exist at run-time. Due to the conversions on lines 07–11 and 12–15, all read and write references to the old yy year bit-field are replaced by equivalent accesses to the new yyyy year bit-field, which has sufficient capacity to refer dates from 4, 194, 304 B.C. to 4, 194, 303 A.D. (assuming a suitable C implementation).

Equivalent Source Text Capabilities

So far, we have discussed basic uses of conversion declarations to implement wide-ranging changes in a large system using a few strategically placed conversion declarations, without further changes to source text.

However, there are cases where it may be desired to have access to equivalent source code changes as well. Some obvious examples are:

1. In a debugger, we may want to make the semantics of any invoked conversion declarations, in addition to what the programmer wrote, visible, so that the user can more easily understand what is happening in a debugging session.

2. Similarly, we may want to make visible the semantics of any conversion declaration invocations triggered by program fragments when an annotated compilation listing of the code is produced.

3. We may want to employ a particular conversion declaration as a temporary transitional step, planning to replace the source code in the long run so that the transitional conversion declaration is no longer needed.

For all of the above reasons, a compiler with conversion declaration capabilities may be deployed along with a source expander facility. The source expander can then be used by the debugger, the lister, and the library maintenance tools to address needs 1–3 above.

The source expander facility takes the source code and generates new source text which has exactly the same semantics as the original source text, but in which certain specific conversion declarations are no longer invoked. Generally, the source text changes required tend to be local to the invoking source fragments, but sometimes wider changes are required to preserve semantics.

Where conversion declarations are to be used as a transitional step in certain system-wide changes, it is recommended that conversion declarations be marked up so that conversion declarations which are transitional can be distinguished from those which are intended to remain. For example, we can begin transitional conversion declarations with something like, say, pending convert . . . [ . . . —or—obsolete convert . . . [ . . .
where "pending" means that this conversion will eventually be eliminated by source transition to a new form, and "obsolete" means that the transition is imminent—the programmer should waste no time in applying the source expander to these transitions. Not only does this make the status of conversion declarations visible at a glance, but it allows the source expander to selectively transition invocations of marked conversion declarations, without requiring an explicit list of which conversion declarations are to be transitioned.

For example, consider the conversions to pre_incr_trans_count (), post_incr_trans_count (), and incr_trans_count () described previously. It might well be the case that we would want eventually to modify the system's source text so that the calls to these routines were made explicitly, instead of being implicit in the incrementation idiom and these three conversion declarations.

To make the transition, we would apply the source expander facility to the system's source text, identifying to it the three relevant conversion declarations. We can identify the conversion declarations by any combination of the following:

1. The source_patterns which appear in them; in this case ++trans_count or trans_count++ (or parts thereof).

2. The result_patterns which appear in them; in this case pre_incr_trans_count(), post_incr_trans_count(), and incr_trans_count() (or parts thereof).

3. A label name which we associate with them. To support this, the preferred syntax must be extended to permit a label, so that a conversion using a label begins with "convert CD_label_name: entire_mode [ . . . ".

A complication which arises in connection with use of an source expander facility is visibility or access control. In C, this is not an issue: opaque types are not much used. The only way to declare one is to use an incomplete structure, union, or enum type, declaration, such as "struct OPAQUE;", which declares a struct type named OPAQUE, with unknown members and unknown size. However, since conversion declarations require names, including member names, used in their patterns, to be defined, then any program fragment which can 'see' a conversion declaration which uses the member names must obviously have traversed the source text which declares them, and all code which 'sees' such declarations has exactly the same level of access to the declared entities.

In C++ and many other languages, however, visibility control can be a live issue. Generally, the problem is that certain members or components are permitted to be used only in certain scopes within the source text for the system. For example, private members of a C++ class can only be accessed by a member function or friend function or friend class of that class.

Note that the compiler still has complete information on such privileged components. Therefore, all that is needed to be able to facilitate the work of the source expander is to provide an easy way for the modified source text generated by the source expander to refer to elements with privileged access in the 'wrong' scopes.

In C++, the component access operators are "::", ".", and "–>", used, respectively, to access class members, members in class instances, and members in target class instances accessed via a pointer. (Recall that struct and union types are considered special kinds of classes in C++.) To facilitate the work of the source expander, we need only provide 'privileged' versions of these operators—say, "::?", ".?", and "–>?", respectively—and a compilation flag indicating whether or not such forms are permitted.

The issue here is that, being lexically scoped, conversion declarations declared within a C++ class, say, would have the same privileges as other code with the class, including privileged access to members. However, when we expand an invocation of a conversion declaration outside the class, this privileged access is revoked. We need the 'privileged access' operators to let the source expander produce a straightforward textual expansion with equivalent semantics. Of course, the source expander would only use the privileged access operators where they are actually required; all accesses which could be made without them would be expanded without them by the source expander.

Plainly, the privileged access operators should only be used to (1) make visible the semantics of the compiled code for debugging or listing purposes or (2) support short-term code patches. Uses beyond those would destroy the software engineering benefits of making certain accesses privileged.

Note that the textual expansions produced by the source expander are not equivalent to mere macro expansions or textually based substitutions. All of the aforenoted weaknesses of text-based systems are still avoided when the source expander is used selectively. Even wholesale use of the source expander avoids many of these weaknesses. The reason is that both the invocation mechanism and the substitution chosen remain semantically rather than textually based when the source expander is employed.

Implementing Conversion Declarations and a Source Expander

What follows is a discussion of how a compiler should be structured in order to support conversion declarations and a source expander facility, and what additional tools are needed to support the source expander capability.

It would be possible to have a compiler which converted its entire source program into internal linked data structures in the form of trees, together with a symbol table and type table. However, such an internal form for annotated program source would be excessively bulky.

We can, however, compactly represent the entire source of a large program as a flat string of bytes in Polish form, as shown in FIG. 3.

Polish form is a compact format for the representation of trees, where nodes generally represent some operation or pseudo-operation. The representation is simple: if a node has a fixed 'arity' (i.e., a fixed number of arguments or a fixed number of inputs), it is represented as a size, followed by the encoding of its operation or pseudo-operation, followed immediately by the representation of its operand subtree(s) (if any), from left to right. The size field makes it possible to navigate the tree swiftly. If we have to deal with nodes having many children, and we need more speed, we could 'index' the descendants to speed up access further. If it is variadic, it is represented as a size, followed by the encoding of its (pseudo-) operation, followed by an operand count, followed by the representation of its operand subtree(s) (if any). Each operand subtree has the same kind of representation; the leaf nodes are those with no further operand subtrees. The entire representation can easily be encoded as a flat sequence of bytes. The size is the number of bytes (or other storage units, if desired) needed to encode the subtree comprising the operation and its operands.

Even expanded to include line number information, such a representation can be about as compact as the original source. Unlike the original source, however, it can be designed to be almost as efficient to navigate as a normal pointer-linked data structure, especially if the above-mentioned 'indexing' of nodes with many children is used.

The representation of a for-statement, for example, would be as shown in FIG. 4a where the init-exp rep is the representation of the initialization expression, the text-exp rep is the representation of the loop termination text expression, and the body-stmt rep is the representation of the statement which forms the body of the loop. The representation of a block with 23 statements in its body would be as shown in FIG. 4b. (Note that for has a fixed count of four operands, whereas block is variadic.)

Figure 5:
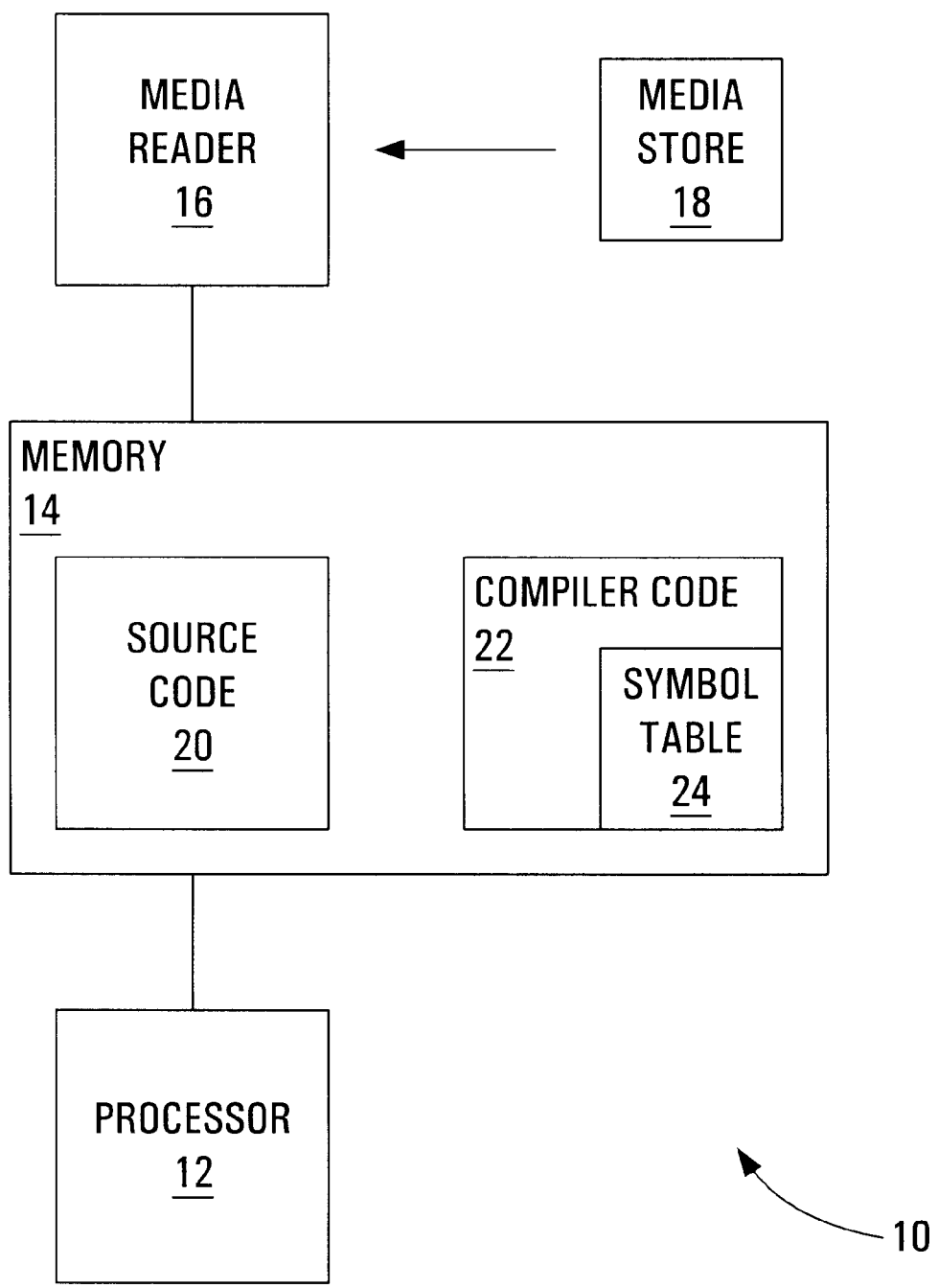
FIG. 5 is a schematic representation of a computer system embodying the subject invention.

Turning to FIG. 5, a computer system 10 comprises a processor 12, a memory 14, a computer media reader 16, and a computer media store 18 (e.g., a computer diskette) storing compiler code. The memory stores a source program 20 and the compiler code 22 uploaded from disk 18. The compiler code has a symbol table 24. The processor 12, under control of the compiler code 22, acts as a compiler.

A suitable representation for conversion declarations in the compiler symbol table 24 uses:

1. A representation similar to that used for routines for the handling of their parameter and access mode information.

2. Polish form for source_patterns and result_patterns, with some special encoding for references to parameters such as beginning the occurrence of a parameter with an otherwise illegal character or character sequence, and representing the parameter as a numeric value stored as one byte.

Conversion declaration information can be placed in the compiler's symbol table as follows:

1. For each type declaring or tied to a conversion declaration, the type information contains an enumeration of the various conversions associated with that type. (The exact implementation used to store this information is irrelevant; it could be a list, table, hash table, etc.). Occurrences of the type trigger an examination of the source_patterns of the conversion declarations associated with the type to see which, if any, apply.

2. Where a conversion declaration is not tied to a specific type, it is generally tied to the use of a particular bound name (i.e., a name tied to certain properties) such as a global variable or procedure definition. In these cases, the name table contains an enumeration of the various conversions associated with that entry. (The exact implementation used to store this information is irrelevant; it could be a list, table, hash table, etc.). Appearance of such a bound name triggers an examination of the source_patterns of the conversion declarations associated with the bound name to see which, if any, apply.

3. Conversion declarations not fitting one of the above two categories are not very useful and can be disallowed.

Thus, to convert a source code program, the processor 12, under program control of the compile code 22, reads the source code program 20 and compares the type or name of a portion of source code with types and names in the symbol table 24. When a match is found, the processor, for each conversion declaration associated with the matching type or name, compares the source code portion with a source semantic pattern along with properties of its substitutable parts. On a match in respect of a given conversion declaration, the processor utilises the result pattern from the conversion declaration in place of the source code portion in generating object code. (In some cases it may be possible that the result pattern of the conversion declaration is written in object code rather than source code so that the compiler merely inserts this object code in place of the source code portion when compiling the program.)

To implement an equivalent source text facility, the compiler should control the replacement of source text matching a conversion declaration with new source text embodying the new semantics specified by the conversion declaration. All source text is exposed to the compiler, including line and column number information, as is the source text for all source_patterns and result_patterns. The compiler can either emit a control file indicating how the original source text must be modified to convert it to the new source text equivalent to the semantics specified by the expanded conversion declaration invocations, or can perform the changes directly.

On the whole, the way to implement the source changes is straightforward, but there is a potential significant complication: because conversion declarations are lexically scoped, like routines, it is entirely possible that the meanings of bound symbols at the point where the expansion is required are not the same as the meanings of those bound symbols where the conversion declaration was declared.

When this situation arises, its occurrence is exposed to the compiler. The compiler must then direct the expansion so that, not only does the required expansion occur at the invocation site, but any needed subsidiary changes must be made to ensure that the semantics are preserved despite the change in scope from the point at which the result_pattern appears in the conversion declaration and the point at which the result_pattern is applied at the conversion declaration invocation.

Consider a simple example:

```
01  typedef unsigned char bool;
      ...
02  unsigned long XOI; /*ADDED: eXtra Overhead Incurred */
      ...
03  convert no_val [] /*ADDED*/
04      ++trans_count; trans count++;
05    to
06      trans_count += 1 + XOI;
07  void order_update (bool XOI) /* eXtract Order Information */{
```

-continued

```
08     ++trans_count;
09   if (XOI) /* Handle eXtraction of Order Info: */ {
       . . .
```

In the above source code fragment, we have a transaction processing system. We keep track of transactions processed in a variable called trans_count. The time comes when we want to weight transactions which incur extra overhead more heavily. When this will occur, we keep the weight in variable XOI declared on line 02. We also write a conversion declaration (lines 03–06) which will modify simple increments of trans_count to add in the value of XOI.

The problem arises when we want to generate equivalent source for the routine order_update starting on line 07. It takes a Boolean parameter, also called XOI, in this case meaning: eXtract Order Information. Our expansion must correctly refer to the XOI declared on line 02, not the XOI declared on line 07.

The solution is that the source expansion facility must rename one of the conflicting XOIs. Since the one declared on line 07 is local to the declaration of order_update, the most sensible choice is to rename this XOI, and to expand the declaration of order_update as shown below:

```
07   void order_update (bool zXOI) /* eXtract Order Information */{
08     trans_count += 1 + XOI;
       . . .
09     if (zXOI) /* Handle eXtraction of Order Info: */ {
       . . .
```

As shown, references to the XOI declared in order_date become references to zXOI. The conflict has been removed, and line 08 now performs exactly the semantics which the invocation of the conversion on it would have achieved.

Modifications of the invention will be apparent to those skilled in the art and, therefore, the invention is defined in the claims.

What is claimed is:

1. A compiler which checks types and usages at compile time, comprising:
   a reader and storer for reading source code of a program having a type system and for, on encountering a conversion declaration for use in upgrading said source code, said conversion declaration having
      a type or bound name to which said conversion declaration is tied;
      a list of substitutable parts, with each substitutable part having a list of properties;
      a set of one or more semantic patterns including said substitutable parts for matching one or more portions of said source code which are tied to said type or bound name; and
      a result pattern showing what will be substituted for each matching portion of said source code,
   storing a representation of said conversion declaration.

2. The compiler of claim 1 including:
   a comparator for comparing portions of said source code program tied to said type or bound name with said semantic patterns including said substitutable parts of said stored representation of a conversion declaration and, based on said comparison, selectively substituting said result pattern of said stored representation of a conversion declaration for said portions of said source code program.

3. The compiler of claim 2 wherein said bound name comprises a procedure or module to which said conversion declaration is tied.

4. The compiler of claim 3 wherein said list of properties for a substitutable part comprises fixed information for properties that are fixed, permissible options for properties that have options, and a "don't care" indicator for properties which may have any possible option.

5. The compiler of claim 4 wherein said list of properties for a given substitutable part comprises access modes for said given substitutable part.

6. The compiler of claim 5 wherein each source pattern comprises multiple statements.

7. The compiler of claim 6 wherein said result pattern comprises multiple statements.

8. The compiler of claim 5 including an indication of an access mode for said source pattern.

9. The compiler of claim 2 wherein said reader and storer is also for adding to properties of fixed parts of said semantic patterns based on placement of said conversion declaration in source code, whereby said conversion declaration is lexically scoped.

10. A method for upgrading source code of a program of a type which has a type system and is statically compiled in a compiler which checks types and usages at compile time, comprising:
   reading source code of said program and for, after encountering a conversion declaration having:
      a type, procedure, or module to which said conversion declaration is tied;
      a list of substitutable parts, with each substitutable part having a list of properties;
      a set of one or more semantic patterns having said substitutable parts for matching one or more portions of said source code tied to said type, procedure, or module; and
      a result pattern showing what will be substituted for each matching portion of said source code,
   comparing portions of said source code which are tied to said type, procedure, or module with semantic patterns in said set of one or more semantic patterns and with said list of substitutable parts;
   on finding a matching source code portion converting said matching source code portion using said result pattern.

11. The method of claim 10 further comprising adding to properties of fixed parts of said semantic patterns based on placement of said conversion declaration in source code, whereby said conversion declaration is lexically scoped.

12. A compiler which checks types and usages at compile time, comprising:
   means for reading source code of a program having a type system and at least one conversion declaration for use in upgrading said source code, said at least one conversion declaration having
      a type or a bound name to which said conversion declaration is tied;
      a list of substitutable parts, with each substitutable parts having a list of properties;
      a set of one or more semantic patterns having said substitutable parts for matching one or more portions of said source code tied to said type or bound name; and
      a result pattern showing what will be substituted for each matching portion of said source code,
   and for placing conversion declaration information in a compiler symbol table in association with said type or said bound name to which said conversion declaration is tied; and means for, on encountering a type or bound name in a source code portion, comparing said encountered type or name with types and names in said symbol table and, on finding a matching type or name, for each conversion declaration tied to said matching type or name, comparing said set of semantic patterns having said substitutable parts of said each conversion declaration with said source code portion and on a match in respect of a given conversion declaration, substituting said result pattern of said given conversion declaration.

13. The method of claim 12 wherein said means for reading and placing is further for adding to properties of fixed parts of said semantic patterns based on a placement of said conversion declaration in source code, whereby said at least one conversion declaration is lexically scoped.

14. A computer readable medium for compiling a source code program, the computer readable medium executable in a computer system, comprising:
   means for reading source code of a program having a type system and at least one conversion declaration for use in upgrading said source code, said at least one conversion declaration having
      a type or a bound name to which said conversion declaration is tied;
      a list of substitutable parts, with each substitutable part having a list of properties;
      a set of one or more semantic patterns having said substitutable parts for matching one or more portions of said source code tied to said type or bound name; and
      a result pattern showing what will be substituted for each matching portion of said source code,
   and for placing conversion declaration information in a compiler symbol table in association with said type or said bound name to which said conversion declaration is tied; and
   means for, on encountering a type or name in a source code portion, comparing said encountered type or name with types and names in said symbol table and, on finding a matching type or name, for each conversion declaration tied to said matching type or name, comparing said set of semantic patterns having said substitutable parts of said each conversion declaration with said source code portion and on a match in respect of a given conversion declaration, substituting said result pattern of said given conversion declaration.

15. The method of claim 1 wherein said means for reading and placing is further for adding to properties of fixed parts of said semantic patterns based on a placement of said conversion declaration in source code, whereby said at least one conversion declaration is lexically scoped.

16. A system, comprising:
   a source code program having a type system and having at least one conversion declaration having:
      a type or a bound name to which said conversion declaration is tied;
      a list of substitutable parts, with each substitutable part having a list of properties;
      a set of one or more semantic patterns having said substitutable parts for matching one or more portions of said source code tied to said type or bound name; and
      a result pattern showing what will be substituted for each matching portion of said source code,
   a compiler which checks types and usages at compile time for reading source code of said program and for, after encountering a conversion declaration in said source code, comparing portions of said source code program with said substitutable parts and said semantic patterns of said encountered conversion declaration and, based on said comparison, selectively substituting said result pattern of said encountered conversion declaration for said portions of said source code program.

* * * * *

UNITED STATES PATENT AND TRADEMARK OFFICE
CERTIFICATE OF CORRECTION

PATENT NO. : 6,195,792 B1  Page 1 of 1
DATED : February 27, 2001
INVENTOR(S) : Mark Andrew Turnbull and Harold Joseph Johnson It is certified that error appears in the above-identified patent and that said Letters Patent is hereby corrected as shown below:

<u>Title page,</u>
Item [75] Inventors, replace "Mark Andrew Turnbull; Harold Joseph Johnson, both of Nepean (CA)" with -- Mark Andrew Turnbull, of Stittsville (CA); Harold Joseph Johnson, of Nepean (CA) --.

<u>Column 18,</u>
Line 17, replace "The compiler of claim 2 wherein said reader and storer" with -- The compiler of claim 1 wherein said reader and storer --.
Line 56, replace "a list fo substitutable parts, with each substitutable parts" with -- a list] of substitutable parts, with each substitutable part --.

<u>Column 19,</u>
Line 11, replace "The method of claim 12 wherein said means for" with -- The compiler of claim 12 wherein said means for --.
Line 14, replace "said conversion declaration in source code, whereby said at" with -- said at least one conversion declaration in source code, whereby said at --.

<u>Column 20,</u>
Line 9, replace "The method of claim 1 wherein said means for reading" with -- The medium of claim 14 wherein said means for reading --.
Line 11, replace "of said semantic patterns based on a placement of said" with -- of said semantic patterns based on a placement of said at least one --.

Signed and Sealed this

Twenty-fifth Day of December, 2001

*Attest:*

*Attesting Officer*

JAMES E. ROGAN
*Director of the United States Patent and Trademark Office*